(12) United States Patent
Zhu et al.

(10) Patent No.: US 12,326,581 B2
(45) Date of Patent: Jun. 10, 2025

(54) IMAGE STITCHING-BASED AERIAL IMAGE FORMATION APPARATUS

(71) Applicant: Zhejiang Prism Holographic Technology Co., Ltd., Zhejiang (CN)

(72) Inventors: Xingfu Zhu, Zhejiang (CN); Xianchu Peng, Zhejiang (CN); Peiying Jiang, Zhejiang (CN)

(73) Assignee: Zhejiang Prism Holographic Technology Co., Ltd., Zhejiang (CN)

( * ) Notice: Subject to any disclaimer, the term of this patent is extended or adjusted under 35 U.S.C. 154(b) by 510 days.

(21) Appl. No.: 17/835,984

(22) Filed: Jun. 9, 2022

(65) Prior Publication Data

US 2022/0397770 A1    Dec. 15, 2022

(30) Foreign Application Priority Data

Jun. 10, 2021   (CN) .............................. 202121289773

(51) Int. Cl.
| | | |
|---|---|---|
| *G02B 30/56* | (2020.01) | |
| *G02B 9/06* | (2006.01) | |
| *G02B 27/00* | (2006.01) | |

(52) U.S. Cl.
CPC .............. *G02B 30/56* (2020.01); *G02B 9/06* (2013.01); *G02B 27/0025* (2013.01)

(58) Field of Classification Search
CPC ...................................................... G02B 30/56
USPC .................................... 353/10; 359/478, 479
See application file for complete search history.

(56) References Cited

U.S. PATENT DOCUMENTS

| | | | |
|---|---|---|---|
| 5,982,343 A | 11/1999 | Iba et al. | |
| 7,950,805 B2 * | 5/2011 | Spodek | G02B 3/005 |
| | | | 353/38 |
| 10,884,376 B2 * | 1/2021 | Sung | G02B 27/1046 |
| 2007/0285791 A1 * | 12/2007 | Vrachan | G02B 30/56 |
| | | | 359/618 |

(Continued)

FOREIGN PATENT DOCUMENTS

| | | |
|---|---|---|
| CN | 108227118 | 6/2018 |
| JP | 2018097046 | 6/2018 |

OTHER PUBLICATIONS

"Office Action of Korea Counterpart Application", issued on Jun. 24, 2024, p. 1-p. 6.

*Primary Examiner* — Wyatt A Stoffa
*Assistant Examiner* — Seth D Moser
(74) *Attorney, Agent, or Firm* — JCIPRNET

(57) ABSTRACT

Disclosed is an image stitching-based aerial image formation apparatus, including sequentially along an optical path direction: an image source comprising a plurality of display units arranged in an array; a rear lens group comprising a plurality of optical lens units arranged in an array; and a front lens group, wherein light rays passing through the rear lens group are converged via the front lens group to render a real image in midair. The disclosure offers the following benefits: by splitting the image source into a plurality of display units arranged in an array and constituting the rear lens group by a plurality of optical lens units arranged in an array, the image is split into smaller patches, such that the longitudinal distance needed for chromatic aberration adjustment also decreases, which shrinks the longitudinal dimension of the whole apparatus so as to be better adapted for installation in a narrow space.

8 Claims, 2 Drawing Sheets

(56) References Cited

U.S. PATENT DOCUMENTS

| | | | | |
|---|---|---|---|---|
| 2008/0013050 A1* | 1/2008 | Boute | ................... | H04N 7/144 |
| | | | | 348/E7.08 |
| 2016/0266477 A1* | 9/2016 | Chou | ..................... | G02B 27/48 |
| 2019/0317387 A1 | 10/2019 | Hanzawa | | |
| 2024/0134189 A1* | 4/2024 | Shimose | ................ | B60K 35/10 |

\* cited by examiner

IMAGE STITCHING-BASED AERIAL IMAGE FORMATION APPARATUS

CROSS-REFERENCE TO RELATED APPLICATION

This application claims the priority benefit of China application no. 2021212897738, filed on Jun. 10, 2021. The entirety of the above-mentioned patent application is hereby incorporated by reference and made a part of this specification.

FIELD

The disclosure relates to an image stitching-based aerial image formation apparatus.

BACKGROUND

A conventional aerial image formation apparatus mainly produces a real image in midair after an image generated from an image source passes through an optical element such as a lens group or a dihedral corner reflector. FIG. 1 illustrates such a conventional aerial image formation apparatus, comprising an image source 1 which presents an image, a rear lens group 3 and a front lens group 4 which perform achromatization to the image, and a reflective mirror which adjusts the angle of the achromatized image to control the position where a real image 5 is rendered. As the technologies for aerial image formation apparatuses become more and more mature, their applications are increasingly wide with assistance of a gesture recognition apparatus. However, in some limited spaces, e.g., inside a vehicle, the conventional aerial image formation apparatus is unadaptable for installation in the vehicle dashboard owing to complex longitudinal dimension requirements; if it is forcibly installed in the vehicle dashboard, the image size it renders would be affected, mainly because the chromatic aberration of the front lens group is usually compensated at the rear lens group, which requires the heights of light rays in the same field of view on the front and rear lens groups be distributed at different sides of the optical axis, such that the size of the aerial image formation apparatus is uncompressible in the longitudinal direction.

SUMMARY

The disclosure provides an image stitching-based aerial image formation apparatus, which can effectively solve a problem that a conventional aerial image formation apparatus is unadaptable for installation in a space with a limited longitudinal dimension.

An image stitching-based aerial image formation apparatus comprises sequentially along an optical path direction:
- an image source comprising a plurality of display units arranged in an array;
- a rear lens group comprising a plurality of optical lens units arranged in an array; and
- a front lens group, wherein light rays passing through the rear lens group are converged by the front lens group to render a real image in midair.

Preferably, the display units are in one-to-one correspondence with the optical lens units to ensure that the images presented by respective display units can pass through the corresponding optical lens units, whereby to facilitate subsequent stitching of the images into a complete image.

Preferably, each of the optical lens units comprises a lens with an Abbe number greater than 50 and a lens with an Abbe number smaller than 50. Such setting facilitates removal of axial chromatic aberration.

Preferably, the front lens group comprises at least one lens with an Abbe number greater than 50 and at least one lens with an Abbe number smaller than 50 which are parallel arranged. Such setting facilitates removal of axial chromatic aberration.

Preferably, each optical lens unit in the rear lens group adopts a combination of a plurality of Fresnel lenses or spherical lenses; or, the rear lens group is an aspherical microlens array (MLA). Whether to select a combination of Fresnel (or spherical) lenses or an aspherical MLA is dependent on the size of each optical lens unit, i.e., in case of a larger size, a combination of Fresnel or spherical lenses is utilized, which facilitates cost reduction; in case of a smaller size, the aspherical MLA is utilized, which facilitates manufacturing and installation.

Preferably, a first reflective mirror is further provided between the front lens group and the real image, which enables further shrinkage of the longitudinal dimension; meanwhile, the position of the real image may be adjusted via the first reflective mirror to facilitate user viewing.

Preferably, a second reflective mirror is further provided between each display unit and the rear lens group. Arrangement of the second reflective mirror enables utilization of the transverse size, thereby further compressing the longitudinal dimension.

Preferably, the image source is located on a focal plane of the rear lens group, wherein light rays passing through the rear lens group become parallel light rays, which facilitates the front lens group to control the specific position of the real image and also facilitates adjusting the front lens group to render a definite real image.

Preferably, the real image is rendered on a focal plane of the front lens group, which facilitates control of the relative position between the front lens group and the rear lens group.

Compared with conventional technologies, the disclosure offers the following benefits: by splitting the image source into a plurality of display units arranged in an array and constituting the rear lens group by a plurality of optical lens units arranged in an array, the image is divided into smaller patches, such that the longitudinal distance needed for chromatic aberration adjustment also decreases, which shrinks the longitudinal dimension of the whole apparatus so as to be better adapted for installation in a narrow space; moreover, the apparatus according to the disclosure is easier for batch production and commercial application.

DETAILED DESCRIPTION

Figure 1:
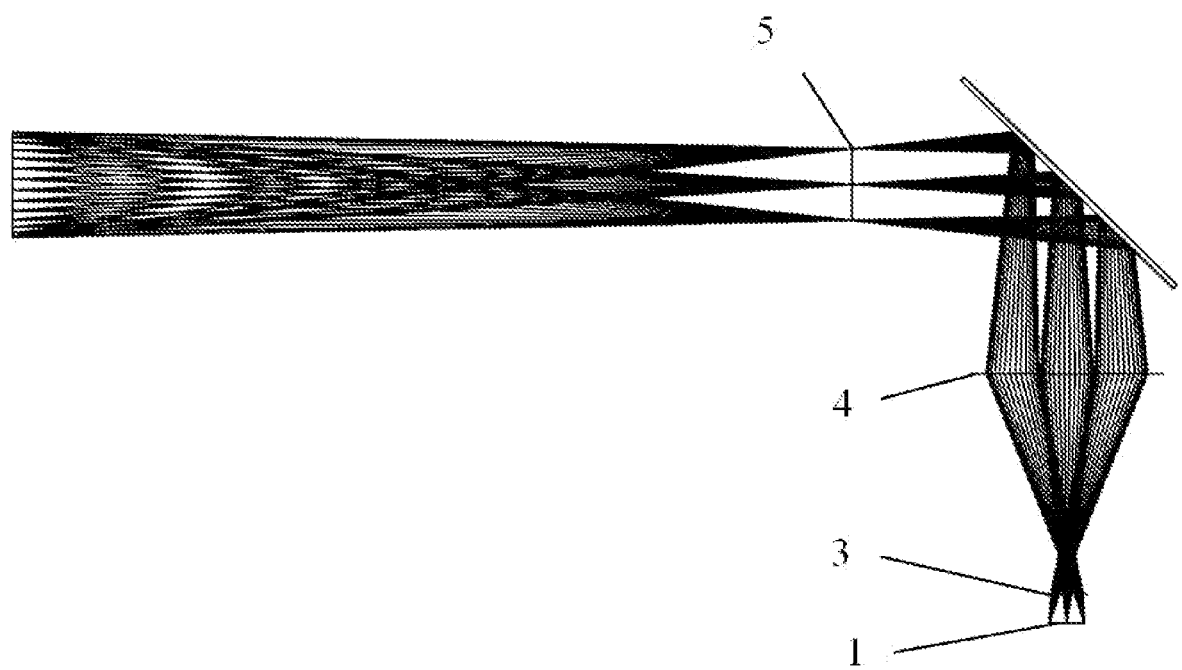
FIG. 1 is a structural schematic diagram of a conventional aerial image formation apparatus.

Hereinafter, embodiments of the disclosure will be described in detail. Exemplary embodiments are shown in the drawings. The embodiments described with reference to the accompanying drawings are intended to explain the disclosure, which shall not be construed as limiting the disclosure.

In the description of the disclosure, it needs to be understood that the orientational or positional relationships indicated by the terms "center," "longitudinal," "transverse," "length," "width," "thickness", "upper," "lower," "front," "rear," "left," "right," "vertical," "horizontal," "top," "bottom," "inner," "outer," and etc. are orientational and positional relationships based on the drawings, which are intended only for facilitating or simplifying description of the disclosure, not for indicating or implying that the devices or elements have to possess those specific orientations and have to be configured and operated with such specific orientations; therefore, they should not be understood as limitations to the disclosure.

In the disclosure, unless otherwise explicitly provided and limited, the terms such as "mount," "connection," "attachment," and "fix" should be understood broadly, which, for example, may refer to a secured connection, a detachable connection, or an integral connection; which may be a mechanical connection or an electrical connection; which may be a direct connection or an indirect connection via an intermediate medium; which may also be a communication between the insides of two elements or the interactive relationships between the two elements, unless otherwise explicitly defined. To a person of normal skill in the art, specific meanings of the above terms in the disclosure may be understood based on specific situations.

First Example

Figure 2:
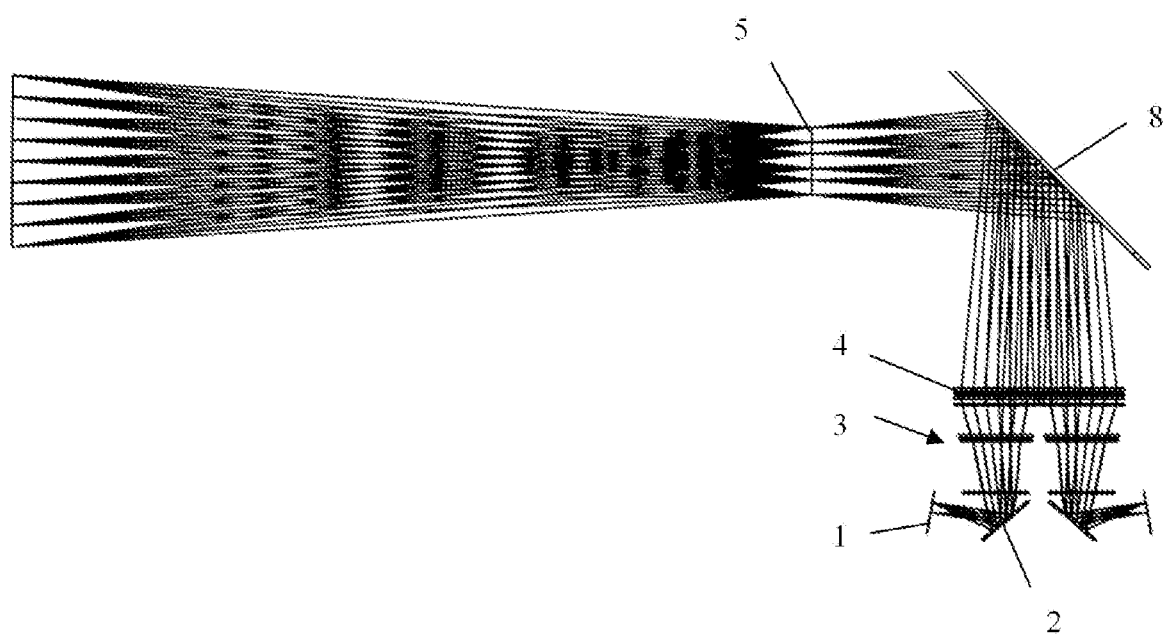
FIG. 2 is structural schematic diagram of an aerial image formation apparatus according to the disclosure.
Figure 3:
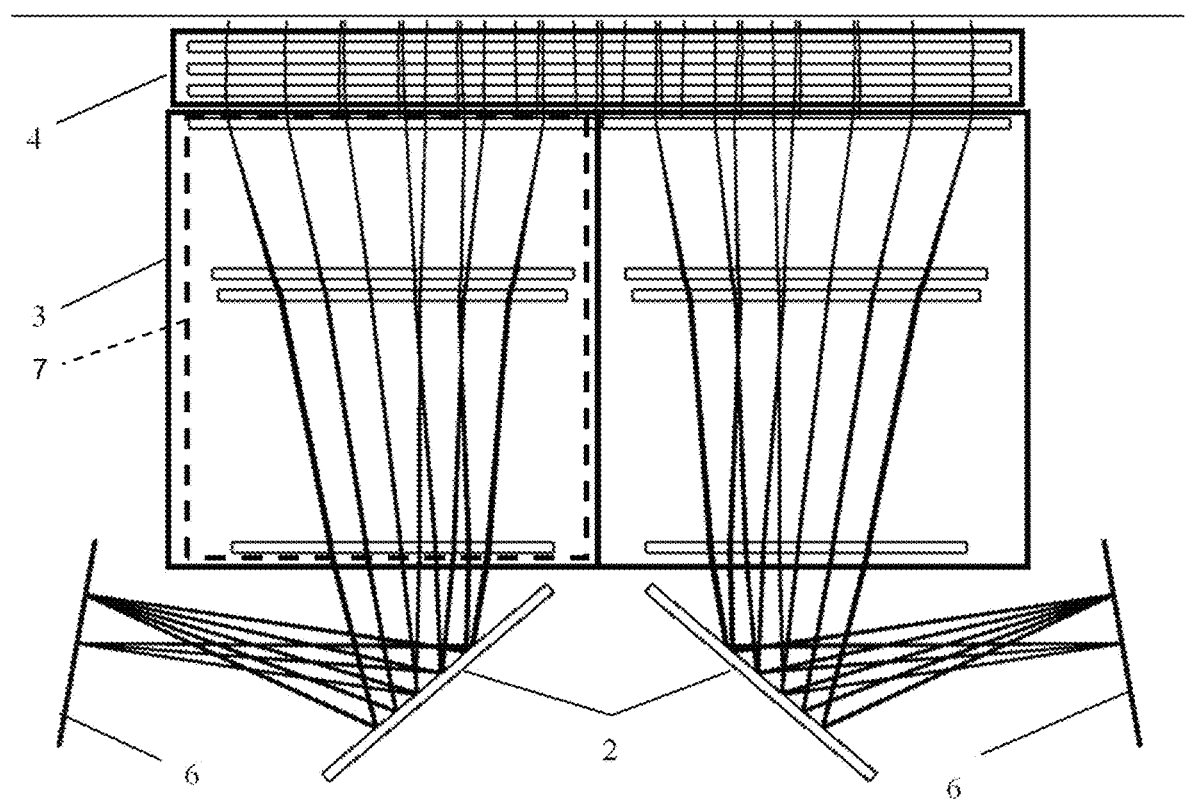
FIG. 3 is a structural schematic diagram of an image source, a rear lens group, and a front lens group in the disclosure.

Referring to FIG. 2 and FIG. 3, an example of an image stitching-based aerial image formation apparatus according to the disclosure is provided, wherein the image stitching-based aerial image formation apparatus comprises sequentially along the optical path direction:

an image source 1, wherein the image source 1 comprises a plurality of display units 6 arranged in an array; the plurality of display units 6 may be arranged in a 2×3 array, and each display unit 6 presents a different part of the whole image to render; of course, to finalize normal stitching, the images presented by two display units 6 which present adjacent images overlap partially;

a rear lens group 3 comprises a plurality of optical lens units 7 arranged in an array. The number of optical lens units 7 in the array and their arrangement manner are consistent with the display units 6, wherein one display unit 6 corresponds to one optical lens unit 7; moreover, the equivalent focal length of the rear lens group 3 is a positive focal length; the image source 1 is located on the focal plane of the rear lens group 3; the light rays emitted from the image source 1, after having passed through the rear lens group 3, become parallel light rays of different angles; and a front lens group 4, which has a positive equivalent focal length, wherein the parallel light rays passing through the rear lens group 3 are converged by the front lens group 4 to render a real image 5 in midair, the real image 5 being located on the focal plane of the front lens group 4.

In this example, each optical lens unit 7 comprises four lenses, wherein some lenses have an Abbe number greater than 50 and some lens have an Abbe number smaller than 50, as long as they can ensure that the overall equivalent focal length is a positive focal length. The front lens group 4 comprises three lenses arranged in parallel, including at least one lens with an Abbe number greater than 50 and at least one lens with an Abbe number smaller than 50. The front lens group 4 and rear lens group 3 such configured enables better removal of the axial chromatic aberrations separately.

In the rear lens group 3, each optical lens unit 7 is sized dependent on the size of the display unit 6. If the display unit 6 has a large size, each lens in the optical lens unit 7 may be manufactured as an independent lens, e.g., a Fresnel lens or a spherical lens; if the display unit 6 has a small size, setting of independent lenses would pose difficulty in manufacturing and precision control of the mutual positions between the independent lenses; therefore, to reduce cost and improve yield, an aspherical microlens array may be employed.

To further compress the size in longitudinal direction, a first reflective mirror 8 is provided between the front lens group 4 and the real image 5; the first reflective mirror 8 not only enables compression of the longitudinal distance, but also enables adjustment of the angle of rendered real image 5. Moreover, a second reflective mirror 2 may be further provided between each display unit 6 and the rear lens group 3; the second reflective mirror enables transverse disposition of the display units 6 to thereby reduce the size requirement on longitudinal direction.

By adjusting the equivalent focal lengths of the front lens group 4 and the rear lens group 3, the apparatus may render an amplified real image 5. The amplified real image 5 may be rendered as long as the equivalent focal length of the front lens group 4 is greater than that of the rear lens group 3.

The light ray emitted from each display unit 6, after being reflected by the second reflective mirror 2, enters the optical lens unit 7 of the corresponding rear lens group 3; after passing through the optical lens unit 7, the light rays become parallel light rays with different angles and then enter the front lens group 4; the incident parallel light rays are converged by the front lens group 4 to render a real image 5 in midair; by adding a first reflective mirror 8 between the front lens group 4 and the real image 5, the direction of rendering the real image 5 may be controlled. The apparatus offers the following benefits: since the image source 1 is split into a plurality of display units 6, and corresponding optical lens units 7 are provided to constitute the rear lens group 3, the image is split into smaller patches, which correspondingly reduces the longitudinal distance needed for adjusting the chromatic aberrations, thereby shrinking the longitudinal dimension of the whole apparatus so as to be better adapted for installation in a narrow environment.

In the example, the equivalent focal length of the rear lens group may also be a negative focal length; but in this case, the equivalent focal length of the front lens group is required to be positive so as to ensure that the light rays are converged to render a real image in midair. It is preferred that the image source 1 is located on the focal plane of the rear lens group 3 and the real image 5 is located on the focal plane of the front lens group 4, as described above, so as to facilitate controlling the specific imaging position of the real image and facilitate user viewing. It is also allowed to render the real image at other positions, but the positions of the rear lens group and the image source need to be preset so as to prevent the real image from being too close to the user's viewing position affecting user experience.

What have been discussed above are only preferred embodiments of the disclosure; however, the technical features of the disclosure are not limited thereto; any change or modification made by a person of normal skill in the art should be covered in the scope of the disclosure.

What is claimed is:

1. An image stitching-based aerial image formation apparatus, comprising sequentially along an optical path direction:
   an image source comprising a plurality of display units arranged in an array;
   a rear lens group comprising a plurality of optical lens units arranged in an array; and
   a front lens group, wherein light rays passing through the rear lens group are converged by the front lens group to render a real image in midair,
   wherein the image source is disposed on a focal plane of the rear lens group.

2. The image stitching-based aerial image formation apparatus according to claim 1, wherein the display units are in one-to-one correspondence with the optical lens units.

3. The image stitching-based aerial image formation apparatus according to claim 1, wherein each of the optical lens units comprises a lens with an Abbe number greater than 50 and a lens with an Abbe number smaller than 50.

4. The image stitching-based aerial image formation apparatus according to claim 1, wherein the front lens group comprises at least one lens with an Abbe number greater than 50 and at least one lens with an Abbe number smaller than 50, which are parallel arranged.

5. The image stitching-based aerial image formation apparatus according to claim 1, wherein each optical lens unit of the rear lens group uses a combination of a plurality of Fresnel lenses or spherical lenses; or, the rear lens group is an aspherical micro-lens array.

6. The image stitching-based aerial image formation apparatus according to claim 1, wherein a first reflective mirror is provided between the front lens group and the real image.

7. The image stitching-based aerial image formation apparatus according to claim 1, wherein a second reflective mirror is provided between each display unit and the rear lens group.

8. The image stitching-based aerial image formation apparatus according to claim 1, wherein the real image is rendered on a focal plane of the front lens group.

* * * * *